Oct. 5, 1937.  C. H. PRESTON  2,095,081
AUTOMATIC SAFETY VEHICLE DOOR LOCK DEVICE
Filed March 5, 1936  2 Sheets-Sheet 1
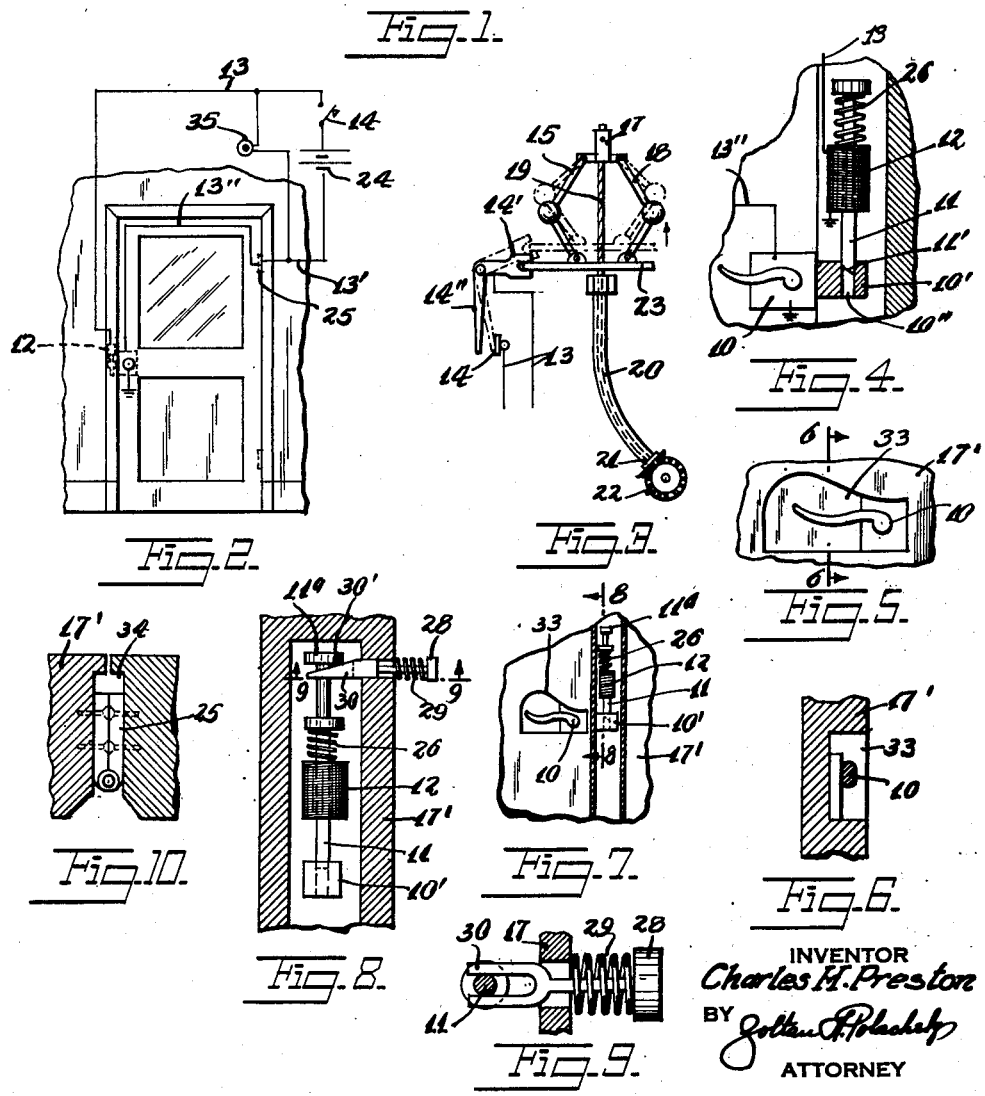
INVENTOR
Charles H. Preston
BY
ATTORNEY Oct. 5, 1937.   C. H. PRESTON   2,095,081
AUTOMATIC SAFETY VEHICLE DOOR LOCK DEVICE
Filed March 5, 1936   2 Sheets-Sheet 2
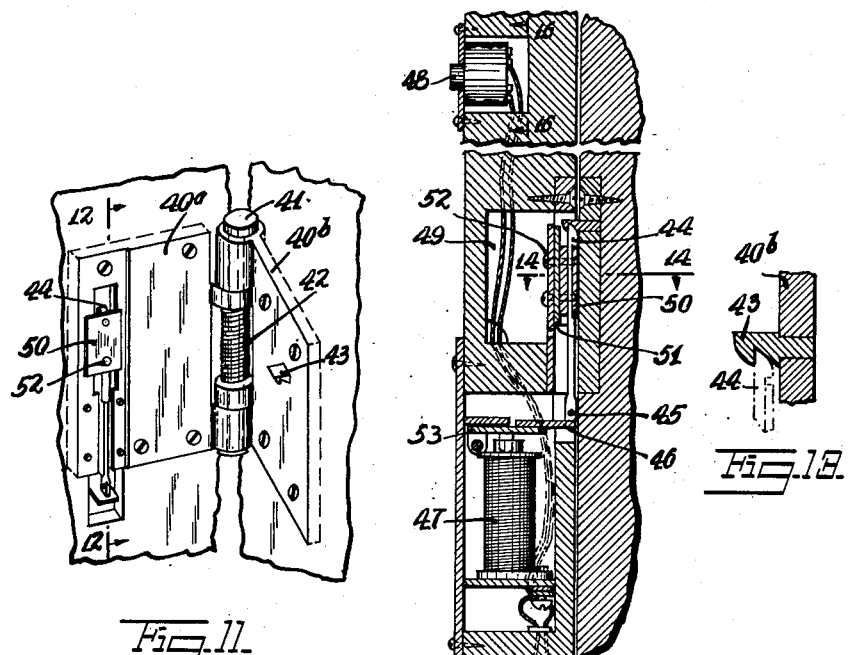
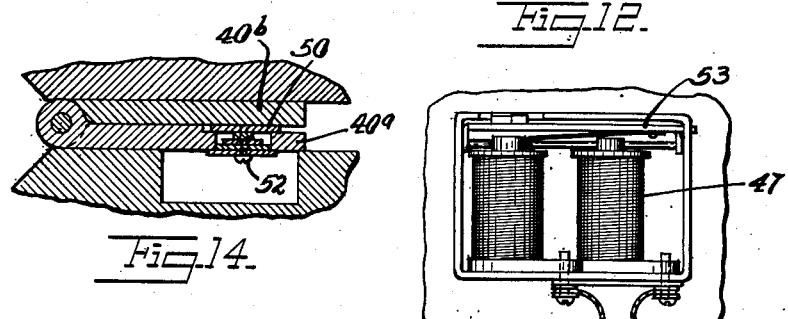
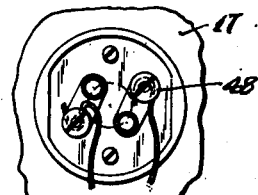
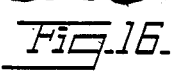
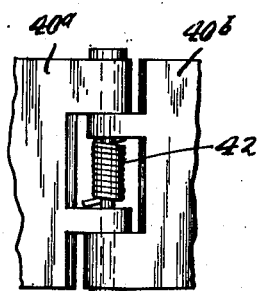
INVENTOR
Charles H. Preston
BY
ATTORNEY Patented Oct. 5, 1937

2,095,081

UNITED STATES PATENT OFFICE 2,095,081

AUTOMATIC SAFETY VEHICLE DOOR LOCK DEVICE

Charles H. Preston, New York, N. Y.

Application March 5, 1936, Serial No. 67,197

3 Claims. (Cl. 180—82)

This invention relates to new and useful improvements in an automatic safety vehicle door lock device.

The invention has for an object the construction of a device as mentioned which is characterized by the fact that it is capable of locking the doors of a vehicle when the vehicle is in motion.

It is a further object of this invention to associate a release device with the driver's door of the vehicle so that the driver may open the door even though the vehicle is in motion.

A further object of this invention is the arrangement of a governor operable when the vehicle to which the device is applied is in motion and controlling a locking mechanism for the doors of the vehicle.

Still further the invention proposes a mechanism for locking the doors of a vehicle electrically releasable upon the depression of a button which may be located on the dashboard of the vehicle.

Another object is the construction of a device as described which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is an elevational view of an automobile equipped with an automatic safety door lock device according to this invention.

Fig. 2 is a fragmentary elevational view of one of the doors of the vehicle equipped with the device according to this invention, to which schematic wiring has been added.

Fig. 3 is a fragmentary elevational view of the governor which actuates the locking mechanism.

Fig. 4 is a fragmentary enlarged detailed view of a portion of the locking mechanism.

Fig. 5 is a fragmentary enlarged elevational view of a portion of Fig. 1.

Fig. 6 is a sectional view taken on the line 6—6 of Fig. 5.

Fig. 7 is a view similar to Fig. 4 but illustrating the mechanism at the driver's seat.

Fig. 8 is a sectional view taken on the line 8—8 of Fig. 7.

Fig. 9 is a horizontal sectional view taken on the line 9—9 of Fig. 8.

Fig. 10 is a fragmentary sectional view taken on the line 10—10 of Fig. 1.

Fig. 11 is a perspective view of a door hinge equipped with an automatic safety vehicle lock device showing a modification of this invention.

Fig. 12 is a vertical sectional view taken on the line 12—12 of Fig. 11.

Fig. 13 is a fragmentary enlarged detailed view of a portion of Fig. 11.

Fig. 14 is a fragmentary enlarged sectional view taken on the line 14—14 of Fig. 12.

Fig. 15 is a front elevational view of the magnets shown in Fig. 12.

Fig. 16 is a sectional view taken on the line 16—16 of Fig. 12.

Fig. 17 is a fragmentary detailed view of the junction portion of the hinge.

The automatic safety vehicle door lock device, according to this invention comprises a door lock 10 having a conventional bolt 10'. A member 11 is associated with the bolt 10' to lock the lock in its locked position. A solenoid is provided for actuating the member 11. This solenoid is arranged in an electric circuit 13 operated by a switch 14 which is controlled by a governor 15 actuated when the vehicle to which the device is applied is in motion.

The governor 15 is mounted upon the body 16 of a vehicle, as for example that shown in Fig. 1. The governor 15 has a stationary bearing 17 which supports weighted arms 18. These weighted arms are adapted to be rotated by a cable 19 which passes through a flexible housing 20 and at the extremity is equipped with a gear 21 meshing with a gear 22 upon the axle of the vehicle. The weighted arms 18 connect with an element 23 engaging a fork portion 14' of a pivotally mounted bell crank 14'', which controls the switch 14.

In Fig. 2 the wiring of the device is illustrated schematically. There is a source of power such as a battery 24 which operates the circuit 13. This battery is in series with the switch 14 and with the solenoid 12. The solenoid is mounted upon the frame of the door and operates the member 11 which engages the bolt 10' of the lock. This lock is mounted on the door. The circuit passes through the door so that it must be opened when the door is opened. The circuit is completed through the contacting edges of the door and door jam on which the lock 10 and the solenoid 12 are mounted. These portions are of metal, and it is only desired to have them work when the door is shut. More particularly, the return lead 13' from the battery passes through the hinge 25 of the door and continues along the lead 13'' to the ground or body of the lock 10. When the doors are closed and the switch 14 is closed by the motion of the vehicle the circuit 13 will be closed energizing the solenoid 12 and cause the member 11 to engage the bolt 10' of the lock nut 10 and thus prevent the door from being opened.

The member 11 is normally urged into a raised position by a spring 26. It is forced downwards against the action of this spring when the solenoid is energized so as to engage the bolt 10'. The lower end 11' of the member 11 is bevelled so that it may automatically engage into a receiving opening 10" in the bolt 10'. The construction for each of the doors is identical to that just described, except the driver's door, indicated by reference numeral 17'. For the driver's door, a special release is provided. This release is in the form of a depressible plunger 28 which is urged into an extended position by a spring 29 and which is formed with a fork 30 upon its inner end. The fork has a bevelled portion 30' which acts as a cam to pry up the member 11. The member 11 has an auxiliary head 11ᵃ beneath which the bevelled fork engages. When the plunger 28 is pressed inwards the member 11 will be raised and moved clear of the bolt 10'.

The vehicle shown on the drawings has several innovations. The door locks are housed within cavities 33 so as to reduce the air resistance of the vehicle when it travels. The cavity 33 is very clearly shown in Fig. 6 wherein it is shown that the lock is set therein. To further reduce the air resistance of the vehicle the hinges 25 of the doors are also sunk in. This is clearly shown in Fig. 10. A recess 34 is formed between the contacting edges of the door and the door frame. It is within these recesses that the hinges are mounted.

The operation of the device is as follows:—

While the vehicle is stationary the switch 14 will be open and consequently the circuit 13 is open. The springs then hold the members 11 in raised positions. All of the doors are thus free to be opened. When the vehicle travels the governor 15 operates which causes the closing of the switch 14. Now, the circuit 13 is closed and all of the members 11 are extended downwards and serve to hold the doors locked. The driver's door may be opened when the plunger 28 is depressed.

A red signal lamp 35 is arranged in parallel in the circuit 13 and preferably should be mounted on the dashboard of the vehicle to indicate to the driver whether or not the safety device is operating. When the lamp is illuminated it signifies that all is well and the vehicle doors locked.

In Figs. 11-17 inclusive a modification of the invention is disclosed in which the automatic safety vehicle door lock is incorporated in one of the hinges of each of the doors. Each of these hinges comprises a pair of leaves 40ᵃ 40ᵇ which are pivotally connected by a pintle pin 41. A coaxial spring 42 is mounted upon the pintle pin and acts to normally urge the leaves closed. Upon one of the leaves there is a stationary bolt 43 adapted to be engaged and held by a movable keeper 44 on the other of the leaves. This keeper 44 is slidably guided and supported by a pintle 45 upon a plate 46 which may be drawn down by an electro-magnet 47. This electro-magnet is in a circuit controlled by a push button switch 48. The bolt 43 and keeper 44 are adapted to automatically engage each other when the door is closed. The door will remain closed unless the keeper 44 is released by closing the switch 48 which will operate the electro-magnet to move the keeper 44 from its operative position.

The recess upon which the movable keeper 44 is mounted is formed with a portion 49 which is partially covered by a plate 50. Several other plates 51 are held spaced from the plate 50 by rivets 52. The movable keeper 44 is slidably mounted between these parts.

The electro-magnet 47 acts against a flexible steel partition 53 upon which the element 46 is mounted. Thus, when the electro-magnet is energized the partition 53 will bend downwards which causes the keeper 44 to move in a like direction.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:—

1. An automatic safety vehicle door lock device, comprising a door lock, a member for locking said lock, a solenoid for actuating said member, an electric circuit for said solenoid, a switch controlling said circuit, and a governor operable when a vehicle to which the device is applied is in motion and adapted to control said switch, said door lock being mounted upon a door and being cooperative with a keeper in the door frame, said member for locking said lock being mounted on the door frame.

2. An automatic safety vehicle door lock device, comprising a door lock, a member for locking said lock, a solenoid for actuating said member, an electric circuit for said solenoid, a switch controlling said circuit, and a governor operable when a vehicle to which the device is applied is in motion and adapted to control said switch, said lock being adapted to be mounted on the door of the vehicle, said member being adapted to be mounted on the frame of said vehicle, and said circuit extending from the frame of the vehicle to the door of the vehicle through a metallic hinge used for supporting the door.

3. An automatic safety vehicle door lock device, comprising a door lock, a member for locking said lock, a solenoid for actuating said member, an electric circuit for said solenoid, a switch controlling said circuit, a governor operable when a vehicle to which the device is applied is in motion and adapted to control said switch, and a manual release for lifting said member to open the lock, comprising a depressible button formed with a cam capable of lifting said member.

CHARLES H. PRESTON.